Feb. 7, 1967   A. L. GOOD   3,302,879
BIMETALLICALLY CONTROLLED PNEUMATIC THERMOSTAT
Filed Aug. 11, 1964   4 Sheets-Sheet 1

INVENTOR
Arthur L. Good

BY *Herbert M. Birch*
ATTORNEY

Feb. 7, 1967   A. L. GOOD   3,302,879
BIMETALLICALLY CONTROLLED PNEUMATIC THERMOSTAT
Filed Aug. 11, 1964   4 Sheets-Sheet 3

INVENTOR
Arthur L. Good
BY Herbert M. Birch
ATTORNEY

United States Patent Office 3,302,879
Patented Feb. 7, 1967

3,302,879
BIMETALLICALLY CONTROLLED PNEUMATIC
THERMOSTAT
Arthur L. Good, Elkhart, Ind., assignor to Robertshaw
Controls Company, Richmond, Va., a corporation of
Delaware
Filed Aug. 11, 1964, Ser. No. 388,823
11 Claims. (Cl. 236—82)

This invention relates to pneumatic thermostats and more particularly to bimetallically controlled pnuematic thermostats.

It is an object of this invention to provide a bimetallically controlled pneumatic thermostat having a novel bimetallic control means therein.

Another object of this invention is to provide a bimetallically controlled pneumatic thermostat having a novel relay operating arm and spring hinge arrangement therein.

Still another object of this invention is to provide a bimetallically controlled pneumatic thermostat having a novel throttling range adjusting means therein.

Yet another object of this invention is to provide a novel bimetallically controlled pneumatic thermostat which is low in cost, accurate, contains an optimally minimized number of parts, and which maintains accuracy and adjustment notwithstanding field installation.

These and other objects of the present invention will become more fully apparent with reference to the following specification and drawings which relate to preferred embodiments of the invention.

In the drawings:

FIGURE 5 is a detail in perspective of a throttling range adjusting means in the thermostat of FIGURE 2;

Figure 1:
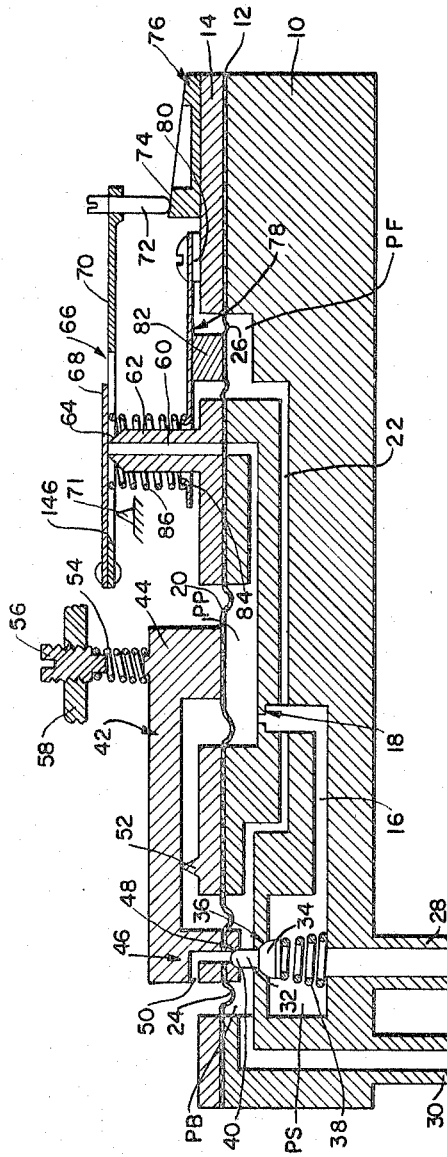
FIGURE 1 is a schematic diagram of the thermostat of the present invention and the pneumatic circuit thereof.

Referring in detail to the drawings, and more particularly to FIGURE 1, the thermostat of the present invention is schematically shown as including a base plate 10, a diaphragm 12 and a pressure plate 14 mounted in stacked relationship.

The base plate 10 includes a main or supply pressure chamber PS which is connected through a port 16 and restrictor 18 with a pilot pressure chamber PP, the latter having a first portion 20 of the diaphragm 12 as one wall thereof, the said first portion 20 being defined by cooperating openings in the base 10 and pressure plate 14, respectively.

The base plate 10 includes a branch pressure chamber PB and a feedback pressure chamber PF which are inter connected by a second port 22. The branch pressure and feedback chambers PB and PF include second and third portions 24 and 26, respectively, of the diaphragm 10 as one wall thereof, these portions being defined by cooperating openings in the base 10 and pressure plate 14.

Supply pressure from a suitable pressure source (not shown) is coupled with the supply chamber PS via an input coupling port 28.

Branch pressure is fed from the branch chamber PB to a desired branch line (not shown) through an output coupling port 30.

The supply chamber PS and the branch chamber PB are selectively interconnected by a two-way relay poppet 32 having its lower inlet portion 34 seated within the supply chamber PS on an integral web and valve seat 36 in the base 10. A compression spring 38 is provided within the supply chamber PS to bias the lower inlet portion 34 of the relay poppet 32 against the valve seat 36.

The upper exhaust portion 40 of the relay poppet 32 extends through the valve seat 36 into the branch chamber PB to a position adjacent the second diaphragm portion 24.

A relay control arm 42 is provided which extends from an integral foot portion 44 resting on the surface of the first diaphragm portion 20 to an integral exhaust valve operator 46 which extends through and is fastened to the second diaphragm portion 24.

The exhaust valve operator 46 includes an exhaust valve seat 48 within the branch chamber PB which is adapted to receive the upper exhaust portion 40 of the relay poppet 32. An exhaust port 50 in the valve operator 46 extends from the exhaust seat 48 to atmosphere.

The relay control arm 42 is pivotally mounted on a fulcrum 52 located intermediate the ends of the control arm on the pressure plate 14.

Manufacturing variations between individual thermostats are selectively compensated by means of a compression spring 54 bearing axially on the foot portion 44 and being variably constrained there against by means of an axially displaceable adjusting screw 56 at the other end thereof, the said screw 56 being threaded through a suitable fixed partition 58 or the like.

The pilot chamber PP is connected with the atmosphere through a leakport 60 which terminates in a leakport nozzle 62 having a frustro-conical tip 64 thereof.

The flow through the leakport 60 is controlled by a leakport lever assembly 66, which includes a bimetallic leakport lever 68 and integral operating arm 70, to be hereinafter more fully described, the said leakport lever 68 being positioned in immediate proximity with the tip 64 of the nozzle 62 across the leakport 60.

The leakport lever assembly 66 is pivoted on one side of the leakport nozzle 62 on fixed fulcrum means 71 above the pressure plate 14. At the opposite side of the leakport nozzle 62, at one end of the operating arm 70, a vertically adjustable integral fulcrum 72 is provided which engages the camming surface 74 of a set point cam 76, the latter being mounted on the pressure plate 14. Thus, the attitude of the operating arm 68 of the leakport lever assembly 66, with respect to the leakport nozzle 62, may be selectively varied.

Stabilizing feedback is provided by means of a flexible feedback lever 78 anchored at one end 80 to the pressure plate 14, having a foot portion 82 intermediate the ends thereof engaging the third portion 26 of the diaphragm 12 and having its other end 84 enclosing the leakport nozzle 62. A feedback spring 86, of the compression type, is mounted concentrically with the leakport nozzle 62 and is held in place by and between the feedback lever 78 and the leakport lever 66.

Figure 2:
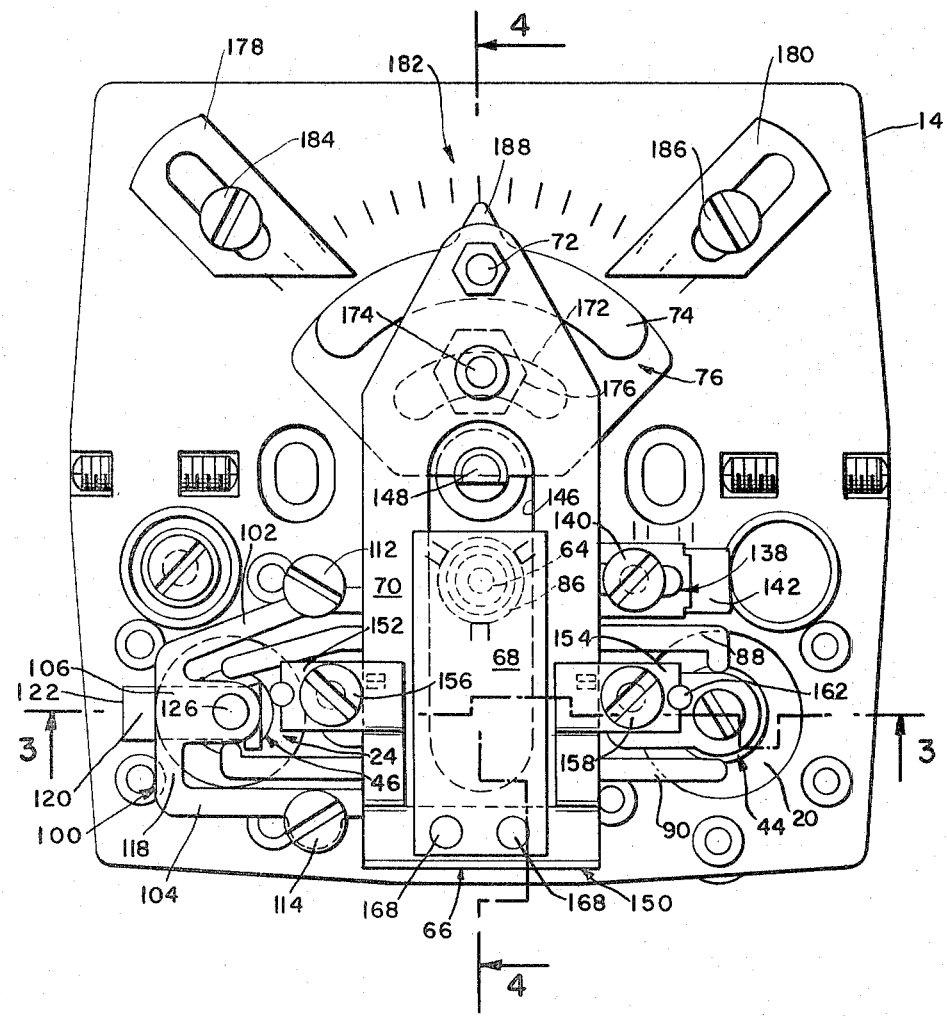
FIGURE 2 is a top plan view of the thermostat of the invention.
Figure 3:
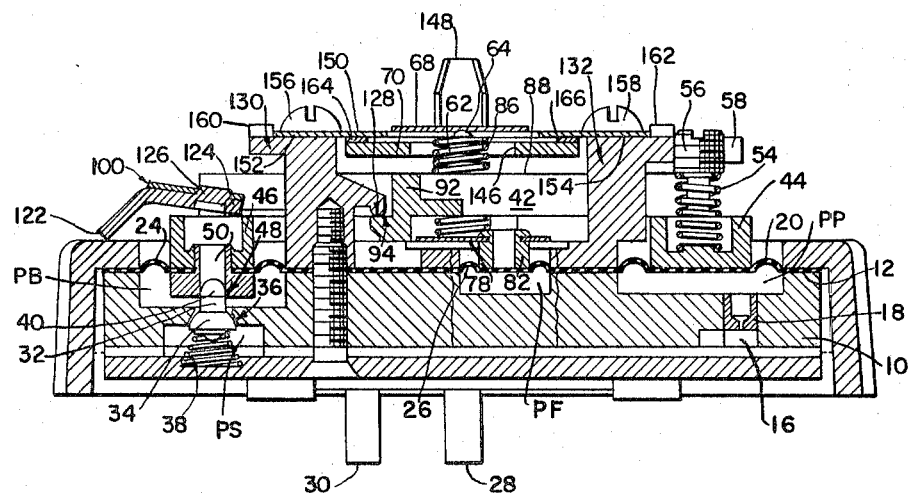
FIGURE 3 is a cross-section taken along line 3—3 of FIGURE 2.
Figure 4:
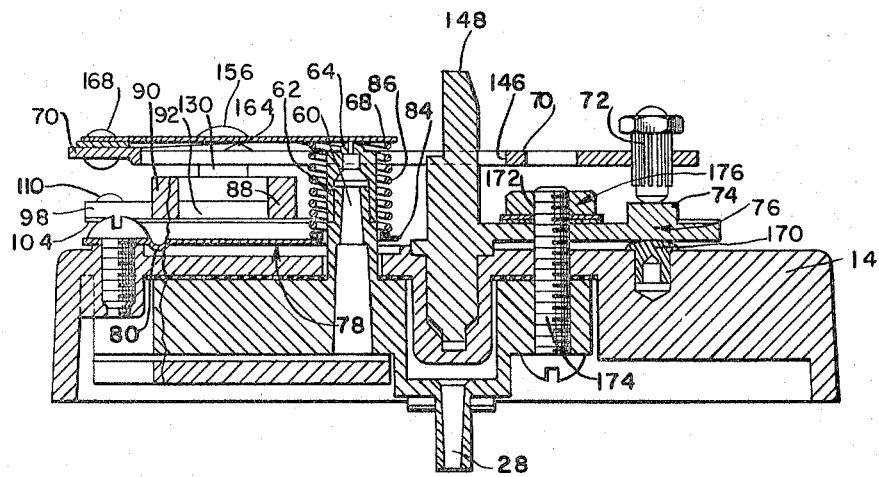
FIGURE 4 is a cross-section taken along line 4—4 of FIGURE 2.

Referring now to FIGURES 2, 3 and 4 a commercial embodiment of the thermostat of FIGURE 1 will now be described, like parts to that of FIGURE 1 bearing like numerals.

Figure 6:
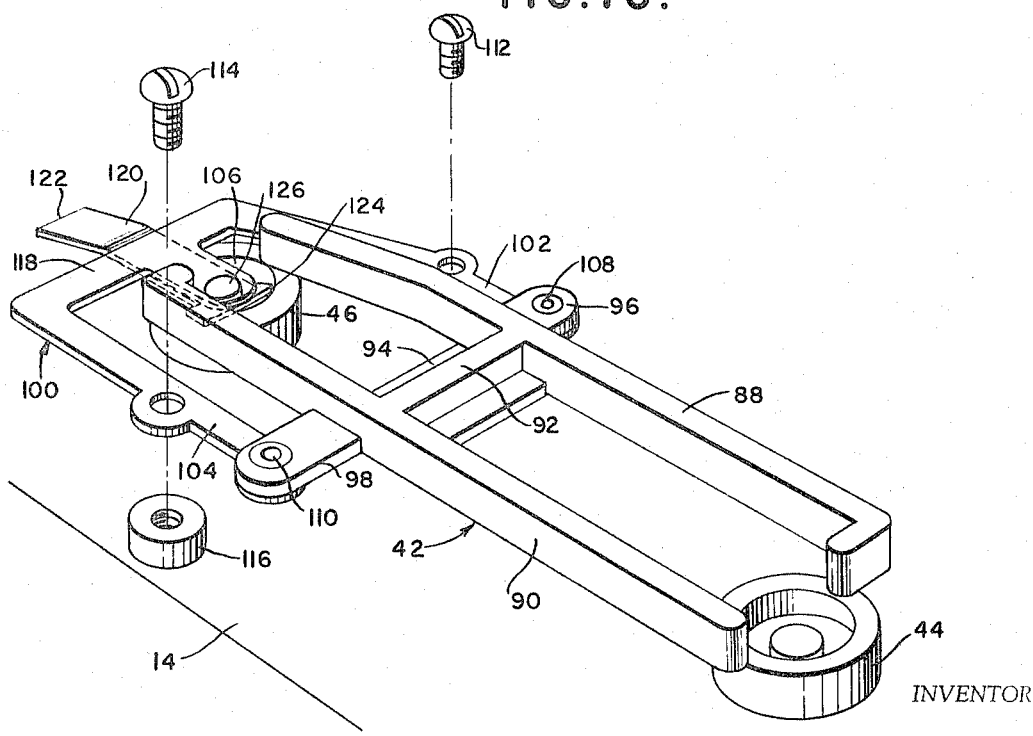
FIGURE 6 is a perspective of the relay arm assembly of FIGURE 2.

The relay control arm 42, referring also to FIGURE 6, is shown as comprising first and second coextensive, and coplanar arms 88 and 90, respectively, joined together by a stepped cross beam 92 having an upwardly facing bearing surface 94 thereon. The opposite ends of both said arms 88 and 90 are integral with the upper surfaces of the foot portion 44 and the exhaust valve actuating means 46 at the first and second diaphragm portions 20 and 24, respectively.

A pair of tabs 96 and 98 extend outwardly from the arms 88 and 90, respectively, of the relay control arm 42 having their longitudinal axes along a line parallel with and within the outer edge of the bearing surface 94 on the crossbeam 92.

A flat spring 100 of irregular E-shape including first and second outer spring arms 102 and 104 adjacent, respectively, the arms 88 and 90 and a central spring arm 106 is mounted on the relay arm 42 by means of rivets 108 and 110, respectively, affixing the tips of the outer spring arms 102 and 104 to the tabs 96 and 98, respectively.

The spring arms 102 and 104 are further anchored, respectively, intermediate the roots and tips thereof by first and second screws or the like 112 and 114 which are threaded into the pressure plate 14, see FIGURES 2 and 6. A boss such as the raised internally threaded boss 116 beneath the spring arm 104 is provided for receiving each of the said screws 112 and 114 and maintaining the spring 100 raised above the pressure plate 14.

The spring 100 further includes a root portion 118 beneath which is extended a downturned finger 120 which is axially disposed along the underside of the central spring arm 106.

The finger 120 has a downturned outer tip 122 engaging the surface of the pressure plate 14 and an inner cruciform tip 124 which straddles the exhaust port 50 and engages the upper edges of the exhaust valve actuating means 46. The finger 120 is affixed to the central spring arm by means of a rivet-like cylindrical extrusion 126 in finger 120 positioned in a hole in the central spring arm 106 with the said spring arm forming a bias to hold the cruciform tip 124 of the finger 120 lightly against the upper edges of valve actuating means 46, see FIGURE 6.

The action of the spring 100 on the relay control arm 42 combined with the constraint thereon by the first and second diaphragm sections 20 and 24, respectively, force the bearing surface 94 of the cross-beam 92 upward against a downturned fulcrum 128, see FIGURE 3.

The fulcrum 128 is integrally formed with a first stanchion 130 disposed between the arms 88 and 90 of the relay arm 42 adjacent the second diaphragm portion 24. A second stanchion 132 is provided between the arms 88 and 90 of the relay arm 42 adjacent the first diaphragm portion 20 for a purpose to be hereinafter more fully described.

The feedback lever 78 extends beneath and transversely of the relay control arm 42 and will now be described with reference to FIGURES 2, 3, 4 and 5.

The foot portion or diaphragm button 82 and the third diaphragm portion 26 are shown as being offset to one side of the longitudinal axis of the feedback lever 78.

On the same side of the longitudinal axis of the feedback lever 78 is a stepped, laterally extending spring arm 134 having a raised bearing surface 136 thereon which is substantially parallel with the plane of the feedback lever 78, see the detail in FIGURE 5.

A throttling range adjusting clip 138 including a set screw adjusting means 140 is mounted on a raised surface portion 142 of the pressure plate 14 and includes a finger 144 which engages the bearing surface 136 of the spring arm 134 and which is longitudinally adjustable along the said bearing surface 136.

Referring further to FIGURES 2, 3 and 4, the leakport lever assembly 66 with bimetal lever 68 will now be more fully described.

The bimetal leakport lever 68 extends over the major portion of a longitudinal slot 146 in the operating arm 70, the uncovered portion of the said slot 146 being adapted to pass the operating shaft 148 of the set-point cam 76, see FIGURE 4.

Figure 7A:
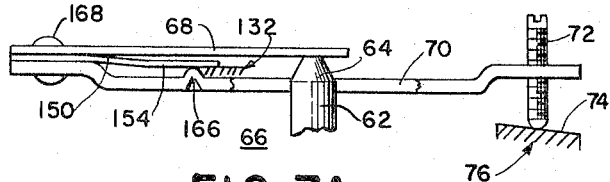
FIGURE 7A is an operational schematic of the bimetal controller of the present invention.
Figure 7B:
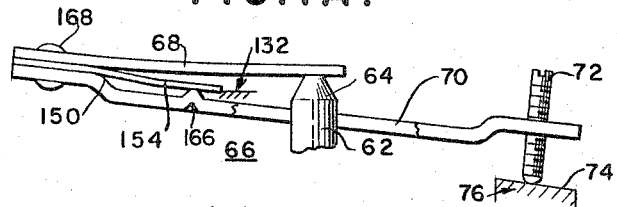
FIGURE 7B is a schematic of a second operational position of the controller of FIGURE 7A.
Figure 7C:
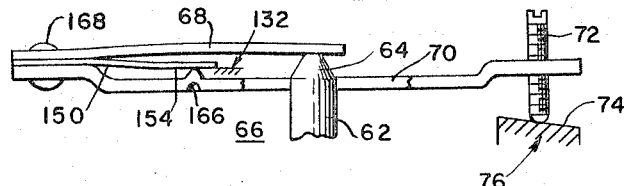
FIGURE 7C is a schematic of a third operational position of the controller of FIGURE 7A.

The entire leakport lever assembly 66 is mounted above and transversely of the relay control arm 42 by means of a square-U-shaped leaf spring 150, see FIGURES 7A, 7B and 7C, having a root portion common to the root of the leakport lever 68 and having first and second transversely extending ears 152 and 154, respectively, extending from the outer ends of the arms of the spring 150 into engagement with the respective upper surfaces of the first and second stanchions 130 and 132, see FIGURES 2, 3 and 4. First and second hold down screws 156 and 158 are provided on the said first and second stanchions, respectively, along with first and second detents 160 and 162 disposed like the said screws, along the longitudinal axes of the transverse ears 152 and 154, whereby no twisting or shifting of the said ears is possible in the plane defined by their respective surfaces.

The arms of the U-spring 150 are held to at least a minimum elevation above the surface of the control arm 70 by means of a pair of integral raised bosses 164 and 166 thereon, located, respectively, adjacent the first and second stanchions 130 and 132.

The root portions of the U-spring 150 and leakport lever 68 are connected with the operating arm 70 by means of rivets 168 or the like.

Referring further to FIGURES 2, 3 and 4, the set point cam 76 is shown as being an integral radial extension of the operating shaft 148 and is held spaced above the pressure plate 14 by means of a boss or cam pad 170 embedded in the said pressure plate 14 directly beneath the cam surface 74. The cam 76 includes a segmental circular slot 172 therethrough, see FIGURE 2, on the same center as the cam surface 74 but of lesser radius through which is extended a variable hold-down bolt 174, capped by nut and washer means 176 which bridges the slot 172. This assembly provides a selectively variable means to control the pressure and frictional engagement between the cam 76 and cam pad 170 and thereby provide high stability to the factory adjustments of the proportional band and throttling range of the thermostat by preventing spurious movement of the cam 76.

A pair of adjustable stops 178 and 180 are positioned on the pressure plate 14 at opposite ends of a set point scale 182 via set screws 184 and 186, respectively, see FIGURE 2. The said stops respectively *engage opposite* sides of a scale index lobe 188 on the cam 76 whereby the end limits of the proportional band of the thermostat are defined.

*Operation*

Referring first to FIGURES 1, 2, 3 and 4, the operation of the thermostat of the present invention will now be described, reference to FIGURE 1 being for the purpose of illustrating the various pressure connections.

A set point is first selected by turning the cam actuating shaft 148 and thereby positioning the index lobe 188 of the set point cam 76 to a desired set point reading on the scale 182.

If it is desired to vary the throttling range of the thermostat, the set screw 140 is loosened and the throttling range clip is moved to change the effective length of the step spring arm 134 (see FIGURE 5) on the flexible feedback lever 78, thus varying the spring force exerted by the feedback lever 78, and the feedback spring 86 against the underside of the leakport lever 68 in response to changes in the branch pressure as reflected in the feedback chamber PF and communicated as a force to the feedback lever 78 via the third diaphragm portion 24 and diaphragm button 82.

If the ambient temperature of a space being monitored by the thermostat drops to the value of the set point temperature or below same, the attitude of the operating arm 70, as set by the cam follower or contact foot 72, combined with the temperature responsive deflection of the bimetal leakport lever 68, is such as to cause the said leakport lever 68 to close the leakport 60 at the nozzle tip 64 against the action of the feedback spring 86.

The relative size of the flow restrictor 18 in the flow port 16 and the leakport 60 are chosen such that when the leakport is fully open, there is an effective balance on either side of the first diaphragm portion 20 between the force exerted thereon in the pilot chamber PP and the opposing force of the foot portion 44 on the relay control arm 42. Between the fully open and fully closed positions of the leakport lever 68 the pressure in the pilot chamber PP is modunlated as a function of temperature over the throttling range of the thermostat.

Assuming a closed position of the leakport lever 68 at the leakport 60, the pilot pressure is caused to increase in the pilot chamber PP resulting in a force unbalance on the first diaphragm portion 20 outward of the pilot chamber PP. This displaces the foot portion 44 of the relay control arm 42 against the action of the compression spring 54 and causes the control arm 42 to rock about the fulcrum 128 on the bearing surface 94. The result is an inward displacement of the exhaust valve actuator 46 and second diaphragm portion 24 with respect to the branch pressure chamber PB, against the action of the flexure hinge spring 100.

Such a displacement of the valve actuator 46 forces the relay poppet 32 downward into the supply pressure chamber PS against the action of the valve spring 38, admitting supply pressure to the branch pressure chamber PB from the supply pressure chamber PS. Simultaneously, the increase in branch pressure is reflected in the feedback chamber PF via the pressure port 22 (see FIGURE 1).

The change in branch pressure is communicated through the outlet port 30 with a suitable control means (not shown) for varying the temperature of the space being monitored, whereby the ambient temperature is gradually raised.

The rising temperature causes a proportionally varying deflection of the bimetal leakport lever 68 which ultimately results in a proportionally open position of the said leakport lever and a closing of the input valve 34 on the seat 36 after a differential temperature change over the throttling range of the thermostat.

Overshoot of the super temperature limit is prevented by both the feedback mechanism imposing a constraint on the leakport lever 68 via the feedback spring 86 and by the exhaust valve 40 unseating from the exhaust seat 48, thereby exhausting the branch pressure chamber PB to atmosphere should the branch pressure tend to increase above the constraints placed thereon by the throttling range and setpoint adjustments of the thermostat.

Since all of the changes in branch pressure are substantially simultaneously reflected in the feedback chamber PF, the corresponding deflections of the relay control arm 42 and the leakport lever 68 are closely coordinated and hunting in the system is eliminated.

Referring to FIGURES 2, 3, 4, 7A, 7B and 7C, the operation of the leakport lever assembly 66 will now be more fully described.

The novel combination of the operating arm 70, U-shaped leaf spring 150 and bimetal leakport lever 68 as pivoted on the stanchions 130 and 132 via the spring ears 152 and 154, respectively, act to effect a parallel attitude of the leakport lever 68 with respect to the flat end surface of the frustro-conical tip 64 of the leakport nozzle 62 during deflection of the said leakport lever 68. Otherwise, proper operation of the leakport 60 and leakport lever 68 to provide useful back-pressure response in modulating the pilot pressure in the pilot pressure chamber PP cannot effect nor can a fully closed position of the leakport lever 68 be obtained.

Geometrically defined, the leakport lever assembly 66 is so constructed that regardless of the curvature of the bimetal leakport lever 68, the end face of the nozzle tip 64 will always be tangent to the arc of the bimetal leakport lever 68 at the point of contact thereof.

The spring ears 152 and 154 form a common pivot means for both the leakport lever 68 and operating arm 70 at a point substantially half-way between the free ends of the respective lever and arm 68 and 70 and the leakport 60 and simultaneously impose a constraint on these free ends through the U-shaped spring 150. Thus, the pivot point for the leakport lever assembly is positioned at the center of the effective length of the bimetal leakport lever 68.

Referring to FIGURE 7A, the bimetal leakport lever 68 and U-spring 150 are shown in an undistorted or unwarped neutral condition and the operating arm 70 is shown as positioned in a horizontal attitude by the cam surface 74 on the set point cam 76.

Referring next to FIGURE 7B, the cam surface 74 has permitted the follower 72 to drop the adjacent end of the operating arm 70 downward giving a "negative" slope attitude to the said operating arm. The U-spring, on the other hand tends to resist this attitude by flexing about the pivot formed by the spring ears 152 and 154. The bimetal leakport lever 68 also resists the shift attitude and closes the leakport 60 in the nozzle tip 64 until such time as an ambient temperature rise causes a change in curvature of the said leakport lever 68 which will open the said leakport and bring the thermostat with which it is associated to a quiescent state.

The reverse or "positive" slope attitude of the leakport lever assembly 66 is shown in FIGURE 7C.

It is hereby emphasized that the angles of attitude shown in FIGURES 7A, 7B and 7C are exaggerated schematic representations for the sake of illustration. In actuality, normal bimetal deflection ranges will only be on the order of 0.025 inch or less. However, the foregoing has illustrated the achievement of a tangential relationship between the leakport lever 68 and the flat end surface of the tip 64 of the leakport nozzle 62.

The thermostat of the present invention may be readily converted from the direct acting type to the reverse acting acting type and vice-versa by reversing the slope of the cam surface 74 and reversing the deflection characteristics of the bimetal leakport lever 68. The operation of either version is identical.

The use of only a single diaphragm 12 for defining all of the movable walls of the branch, feedback and pilot chambers PB, PF and PP, respectively, provides a pneumatic thermostat with an optimally minimum number of component parts for which there has been a long felt need in the art.

Further, the use of branch pressure to effect a directly proportional feedback constraint on the bimetal leakport lever of a pneumatic thermostat has resulted in a stability of control which accurately controls the throttling range of the thermostat and permits smoothly modulated antihunting control in systems being monitored by the present invention.

It is further evident from the foregoing specification and drawings that the specific novel mounting means for both the set point cam 76 and the relay control arm 42 provide optimum stability to the thermostat of the present invenion which minimizes the need for field adjustments thereof caused by handling and dimensional variations during field installations and the like.

It is to be understood that the embodiments of the invention shown and described herein are for the sake of example only and are not intended to limit the scope of the appended claims.

What is claimed is:

1. Pneumatic thermostat means adapted to be connected with a source of supply pressure and provide a modulated branch pressure for a temperature control means comprising a base member including a supply pressure chamber, a branch pressure chamber, a feedback pressure chamber, a supply pressure chamber, relay valve means selectively interconnecting said supply pressure and branch pressure chambers and selectively interconnecting said branch pressure chamber with atmosphere, flow restrictor means interconnecting said supply pressure and pilot pressure chambers and flow means interconnecting said branch pressure and feedback pressure chambers; unitary diaphragm means on said base means forming respective first, second and third flexible wall portions for each of said pilot pressure, branch pressure and feedback pressure chambers; a unitary pressure plate coextensive with said diaphragm means including means in registry with each of said flexible wall portions exposing said wall portions to atmosphere; a relay control arm extending between said first and second flexible wall portions, said arm including a diaphragm engaging foot juxtaposed with said first wall portion, relay valve actuating means connected with said second wall portion, fulcrum means intermediate the ends thereof and flexure hinge means mutually engaging said control arm, said relay valve actuating means and said pressure plate, and secured to said pressure plate maintaining said control arm in position on said fulcrum means; a leakport nozzle having a leakport therein connected with said pilot pressure chamber; a leakport lever assembly including an operating arm, a bimetal leakport lever connected at one end to one end of said operating arm and extending over said leakport adjacent the other end thereof, flexure hinge means connected at one end to said one end of said leakport lever and operating arm and fixed at its other end above said pressure plate substantially midway between the ends of said leakport lever, and cam follower means at the other end of said operating arm; set point cam means on said pressure plate engaged by said cam follower means; and feedback means on said pressure plate interconnected with said third flexible wall portion and said bimetal leakport lever.

2. The invention defined in claim 1, wherein said thermostat further includes throttling range adjusting means comprising adjustable spring means acting on said feedback means in opposition to said third flexible wall portion including resilient arm means integral with and extending from said feedback means and means selectively varying the effective length of said resilient arm means.

3. The invention defined in claim 1, wherein said feedback means comprises resilient lever means fixed at one end to said pressure plate and substantially receiving said leakport through its other end, means interconnecting said resilient lever means intermediate its ends with said third wall portion, and spring means interconnecting said bimetal leakport lever and said resilient lever means adjacent said leakport.

4. The invention defined in claim 1, wherein said feedback means comprises resilient lever means fixed at one end to said pressure plate and substantially receiving said leakport through its other end, means interconnecting said resilient lever means intermediate its ends with said third wall portion, and spring means interconnecting said bimetal leakport lever and said resilient lever means adjacent said leakport; and wherein said thermostat further includes throttling range adjusting means comprising adjustable spring means acting on said resilient lever means in opposition to said third flexible wall portion including a resilient arm means integral with and extending transversely from said lever means and means selectively varying the effective length of said resilient arm means.

5. The invention defined in claim 1, wherein said set point cam means comprises an operating shaft, a cam body integral with said operating shaft and extending radially therefrom over said pressure plate, an arcuate cam surface on the face of said cam body extending away from said pressure plate, a mounting pad in said pressure plate engaging said cam body directly beneath said arcuate cam surface, and means intermediate said cam surface and said operating shaft forcing said cam body to bear upon said mounting pad with a selectively variable force.

6. In a pneumatic relay including a pilot pressure chamber, a branch pressure chamber, a relay valve in said branch pressure chamber, first and second adjacent flexible wall portions, respectively, for said pilot pressure and branch pressure chambers, and a pressure plate defining said flexible wall portions, a relay control arm extending between said first and second flexible wall portions comprising a foot engaging said first wall portion, relay valve actuating means connected with said second wall portion, fulcrum means intermediate the ends thereof and flexure hinge means mutually engaging said relay control arm, said relay valve actuating means and said pressure plate and secured to said pressure plate maintaining said control arm in position on said fulcrum means.

7. In a pneumatic thermostat including a leakport nozzle having a leakport therein and a set point cam means, a leakport lever assembly comprising an operating arm, a bimetal leakport lever connected at one end to one end of said operating arm and extending over said leakport adjacent the other end thereof, flexure hinge means connected at one end to said one ends of said operating arm and fixed at its other end adjacent said operating arm substantially midway between the ends of said leakport lever, and cam follower means at the other end of said operating arm engaging said set point cam means.

8. In a pneumatic thermostat including leakport nozzle means with a leakport, bimetal controlled leakport lever means controlling the leakport of said leakport nozzle means in response to ambient temperature variations and pneumatic relay means providing a modulated branch pressure output as a function of the relative displacement of said bimetal controlled leakport lever means with respect to said leakport of said nozzle means, feedback means imposing a constraint on said leakport lever means as a function of said branch pressure output comprising a feedback pressure chamber directly connected with said branch pressure output, a flexible wall in said chamber, resilient feedback lever means extending over said flexible wall fixed at one end, interconnected with said flexible wall intermediate its ends and extending to a position adjacent said leakport of said nozzle means at its other end, and spring means interconnecting said leakport lever means and said other end of said resilient feedback lever means.

9. In a pneumatic thermostat including leakport nozzle means with a leakport, bimetal controlled leakport lever means controlling the leakport of said leakport nozzle means in response to ambient temperature variations and pneumatic relay means providing a modulated branch pressure output as a function of the relative displacement of said leakport lever means with respect to said leakport of said nozzle means, in combination, feedback means imposing a constraint on said leakport lever means as a function of said branch pressure output comprising a feedback pressure chamber directly connected with said branch pressure output, a flexible wall in said chamber, resilient lever means extending over said flexible wall fixed at one end, interconnected with said flexible wall intermediate its ends and extending to a position adjacent said leakport of said nozzle means at its other end, spring means interconnecting said leakport lever and said other end of said resilient lever means; and throttling range adjusting means for said thermostat comprising adjustable spring means acting on said resilient lever means in opposition to said flexible wall portion of said feedback pressure chamber.

10. In a pneumatic thermostat means including a pilot pressure chamber, a branch pressure chamber and a feedback pressure chamber having first, second and third flexible wall portions, respectively, a relay control arm differentially posioitioned by said first and second flexible wall portions and feedback means positioned by said third flexible wall portions, throttling range adjusting means for said thermostat comprising adjustable spring means acting on said feedback means in opposition to said third flexible wall portion including a resilient arm means integral with and extending from said feedback means and means selectively varying the effective length of said resilient arm means.

11. In a pneumatic thermostat means, set point cam means comprising an operating shaft, a cam body integral with said operating shaft and extending radially therefrom, an arcuate cam surface on the face of said cam body, a mounting pad engaging said cam body directly opposite said arcuate cam surface, and means intermediate said cam surface and said operating shaft forcing said cam body to bear on said mounting pad with a selectively variable force.

References Cited by the Examiner

UNITED STATES PATENTS

| 624,046 | 5/1899 | Johnson | 236—82 |
| 680,423 | 8/1901 | Winkenwerder | 236—82 |
| 2,280,345 | 4/1942 | Nickells | 236—87 X |
| 2,285,540 | 6/1942 | Stein et al. | 236—82 |
| 2,742,917 | 4/1956 | Bowditch | 137—86 |
| 2,828,077 | 3/1958 | Mott | 236—82 |

ALDEN D. STEWART, *Primary Examiner.*